Nov. 11, 1947.    L. C. MILLER    2,430,776
EXPANSIBLE CHAIN
Filed May 24, 1945
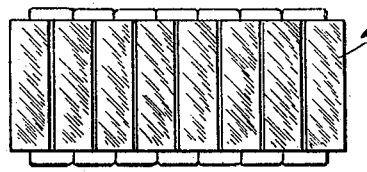
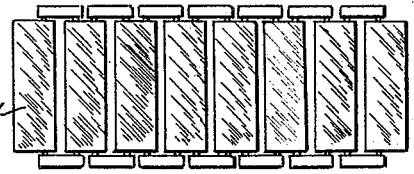
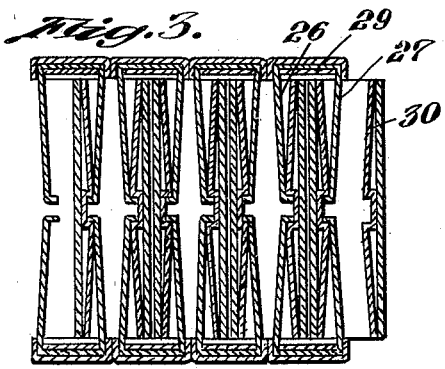
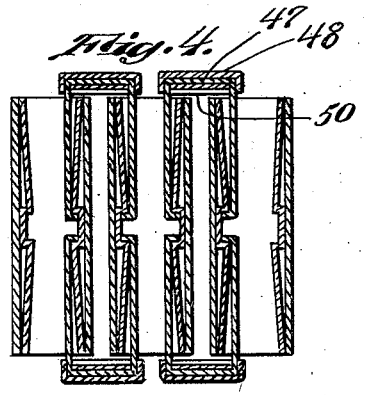
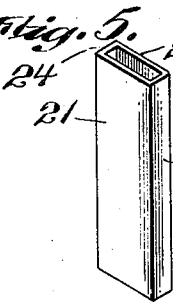
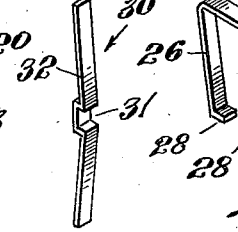
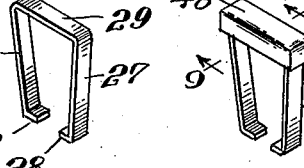
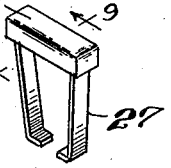
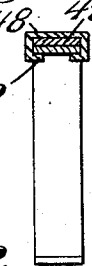
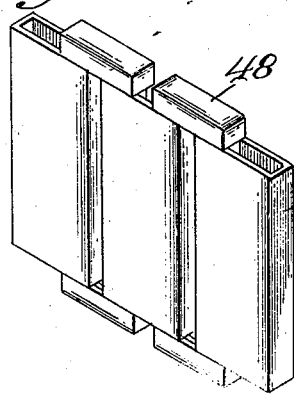
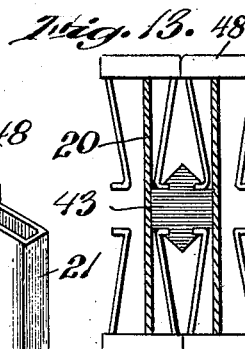
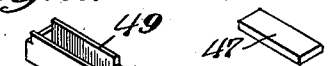
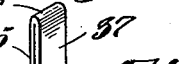
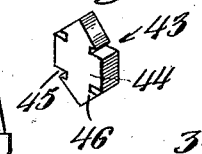
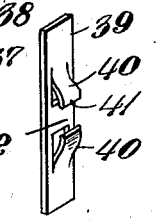
INVENTOR
Lawrence C. Miller
BY Barlow & Barlow
ATTORNEYS Patented Nov. 11, 1947

2,430,776

UNITED STATES PATENT OFFICE 2,430,776

EXPANSIBLE CHAIN

Lawrence C. Miller, Charlestown, R. I.

Application May 24, 1945, Serial No. 595,499

8 Claims. (Cl. 59—80)

This invention relates to a chain for ornamental purposes such as a bracelet for the attachment of a wrist watch.

Chains of various constructions have been provided which are not elastic and not expansible in the direction of their length. When an elastically expansible chain is made a construction is usually resorted to which is more complicated structure and on a different plan.

One of the objects of this invention is to provide an elastic chain which is formed similar to a non-elastic chain but in which certain of the connecting elements are elastic or resilient so that the end result is an elastic chain by reason of a small or limited amount of elasticity in each of the connectors between the links.

Another object of this invention is to provide an elastic chain which will be of ornamental appearance and one which will be comfortable on the wrist.

Another object of this invention is to provide an elastic chain the length of which may be easily regulated by attaching links to or detaching links from the chain that the desired length may be made up.

With these and other objects in view, the invention consists of certain novel features of construction, as will be more fully described and particularly pointed out in the appended claims.

In the accompanying drawings:

Fig. 1 is a top plan view of the chain in contracted position;

Fig. 2 is a view similar to Fig. 1 but showing the chain in extended position;

Fig. 3 is a section on a somewhat larger scale than shown in Fig. 1 of the chain in contracted position;

Fig. 4 is a section showing the links extended or expanded one with reference to the other;

Fig. 5 is a perspective view of one of the links;

Fig. 6 is a perspective view of one of the locking means members;

Fig. 7 is a perspective view of one of the connectors;

Fig. 8 is a perspective view of one of the connectors with a cap applied thereto;

Fig. 9 is a sectional view on line 9—9 of Fig. 8;

Fig. 10 is a perspective view of the links in expanded position;

Fig. 11 is a perspective view looking at the underside of the cap;

Fig. 12 is a perspective view of a washer which is located beneath the cap;

Fig. 13 is a sectional view through the links showing a modified form of locking means for the connectors;

Fig. 14 is a perspective view of the locking means alone;

Fig. 15 is a perspective view of a still different modification of locking means; and Fig. 16 is a perspective view of a still different modification of locking means.

In proceeding with this invention tubular links which have open ends are locked together by extending fork members into the open end of adjacent links progressively along the length of the chain. These forks extend inwardly from opposite directions and these forked members are locked in this position to hold the chain links in assembly. Each of the forked connectors are resilient so that the legs of the fork may each spread apart from one another to afford some expansibility to the chain. Some means are provided for locking the legs of the forks in position.

With reference to the drawings 20 designates one of the tubular links which are to be connected in the chain. The particular form illustrates opposite top and bottom walls 21 and 22 and side walls 23 and 24 having open ends as shown in Fig. 5. The forked connectors are designated generally 25 and are shown in perspective in Fig. 7. Each consists of legs 26 and 27 with inturned fingers 28 at their ends with a connecting bridging portion 29. The leg 26 is placed into the end of one link and the leg 27 is put into the end of the next link as shown in Fig. 3 with the bridging portion 29 extending between the two links. The same occurs at the opposite ends of the links which are so connected. Some means are provided for engaging the fingers 28 so that these connectors cannot move outwardly from the ends of the links and I have illustrated several different forms of a means for accomplishing this result.

In Fig. 6 I have illustrated a strip of material 30 which is substantially the length of a link and which is provided with a recess 31 at its midpoint. This recess is formed by shaping the strip into U form at its center with its arm 32 extending outwardly from the wall of the recess and inclined rearwardly therefrom. Two such locking members are positioned in each tubular link, one to lie along the wall 23 and the other to lie along the wall 24. The fingers 28 of the connectors 25 when positioned into the ends of the links will extend into the recess 31 and be prevented from being pulled outwardly from the ends of the link. The bridge 29 at one end will prevent the legs from being pulled through the link away from this bridge.

Another form of locking means is illustrated in Fig. 15 where I have provided a strip 35 folded inwardly at each of its ends as at 36 to form portions 37 extending toward each other but not meeting so as to form a recess 38 between the ends of the members 37 with the ends providing abutments. This recess serves the same purpose as the recess 31 of the strip 30.

In another case, as shown in Fig. 16, a strip 39 is provided and here I have cut and raised from the stock of this strip abutments 40 which have their ends 41 in spaced relation. The fingers 28 of connector 25 may thus extend into the space 42 between these ends 41 and be locked by engagement with the ends 41 of the abutment 40.

In still another instance I may provide this locking means all in one piece as shown in Fig. 14 at 43. Here there is a block designated generally 44 which is provided with four notches 45 which form abutments 46 by the walls of the notches so that when the fingers 28 extend into the notches they engage these walls or abutments 46 and the members 25 will be prevented from being pulled outwardly through the ends of the links. In this last form the member 43 alone is located in each link and as it has four notches these serve the purpose of two strips of the form shown in Figs. 6, 15, and 16.

It will be understood that the legs 26 and 27 of the connector 25 are flexible or resiliently connected at their bend to the bridging portion 29 so that they will flex outwardly away from each other to place them under an inherent tendency due to the resiliency of the stock to move toward each other into the position shown in Fig. 7 when relaxed.

By this arrangement when the links 21 are placed under an endwise tension in the chain they will expand from the position shown in Fig. 1 to the position shown in Fig. 2 and when the tension is released will return to the position shown in Fig. 1.

In order to cover the bridging portion 29 of the connectors I provide a washer or plate 47 to lie against bridging portion 29 and then provide a cap 48 to engage the washer and cover the bridging portions. Lips 49 are bent beneath bridging portion 29 as shown at 50, Fig. 9, so as to hold the cap in position.

I claim:

1. An expansible chain comprising a series of open end tubular links, forked connectors each having resilient legs elastically movable toward and from each other engaging said links progressively and from opposite ends, and means locking the oppositely projecting legs together.

2. A chain as set forth in claim 1 wherein said means comprises a member having recesses and said legs having right angularly extending ends to enter said recesses.

3. A chain as set forth in claim 1 wherein said means comprises a member extending from end to end of said links and having recesses and said legs having inturned ends to extend into said recesses.

4. A chain as set forth in claim 1 wherein said means comprises a pair of members in each link each having a recess and said legs each having inturned ends to extend into one of said recesses.

5. A chain as set forth in claim 1 wherein said means comprises a member in each link having four recesses and each of the four legs in the link have right angularly extending ends to enter said recesses.

6. A chain as set forth in claim 1 wherein said means comprises a pair of members in each link each having means to engage and retain two fingers on the ends of said legs.

7. A chain as set forth in claim 1 wherein said connectors have the legs resiliently connected by the bridge between said legs.

8. A chain as set forth in claim 1 wherein said connectors have the legs resiliently connected by the bridge between said legs and said legs converge toward each other when in normal untensioned position.

LAWRENCE C. MILLER.

REFERENCES CITED

The following references are of record in the file of this patent:

UNITED STATES PATENTS

| Number | Name | Date |
| --- | --- | --- |
| 1,860,186 | Kestenman | May 24, 1932 |